3,353,979
MOLYBDATED ZINC OXIDE PIGMENTS AND METHOD FOR THE PREPARATION THEREOF
James V. Hunn, Avon Lake, Ohio, assignor to The Sherwin-Williams Company, Cleveland, Ohio, a corporation of Ohio
Filed June 29, 1964, Ser. No. 379,444
4 Claims. (Cl. 106—292)

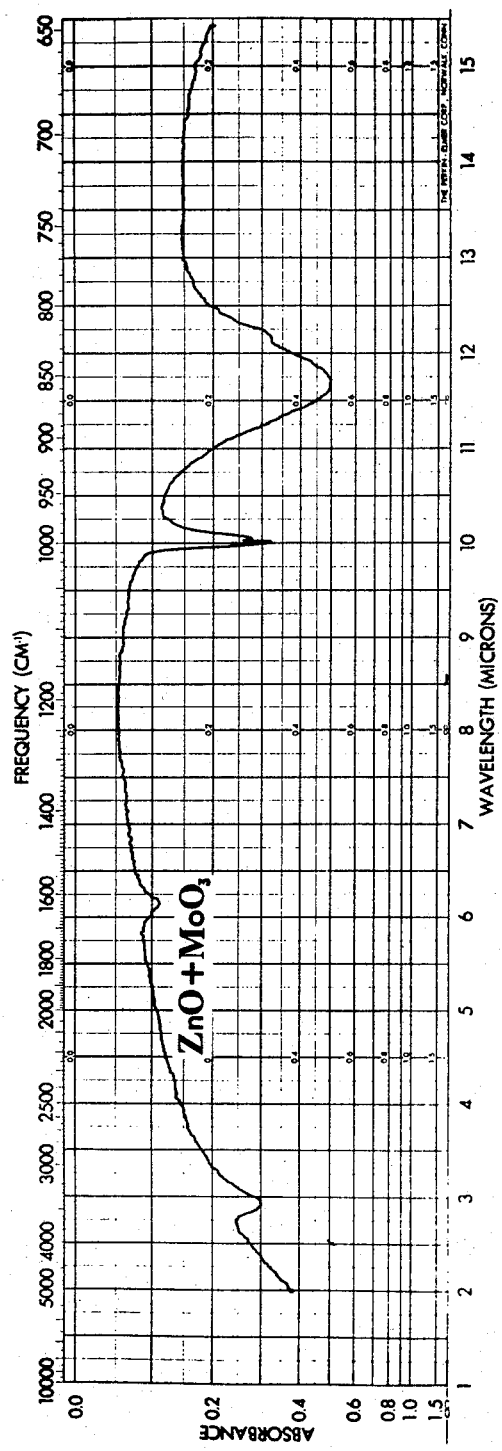

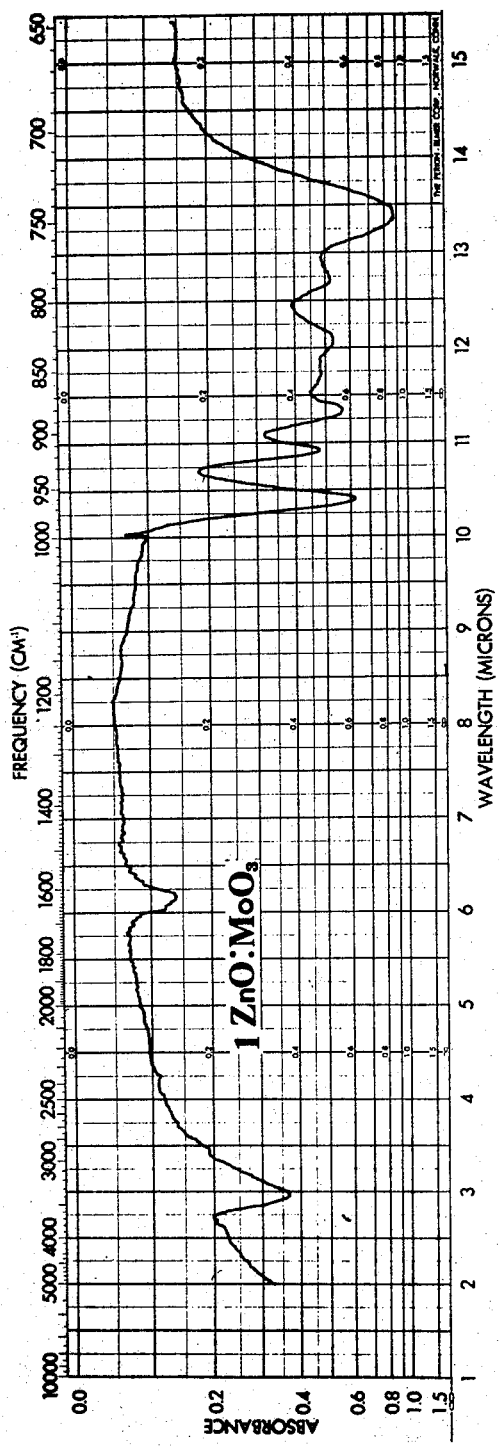

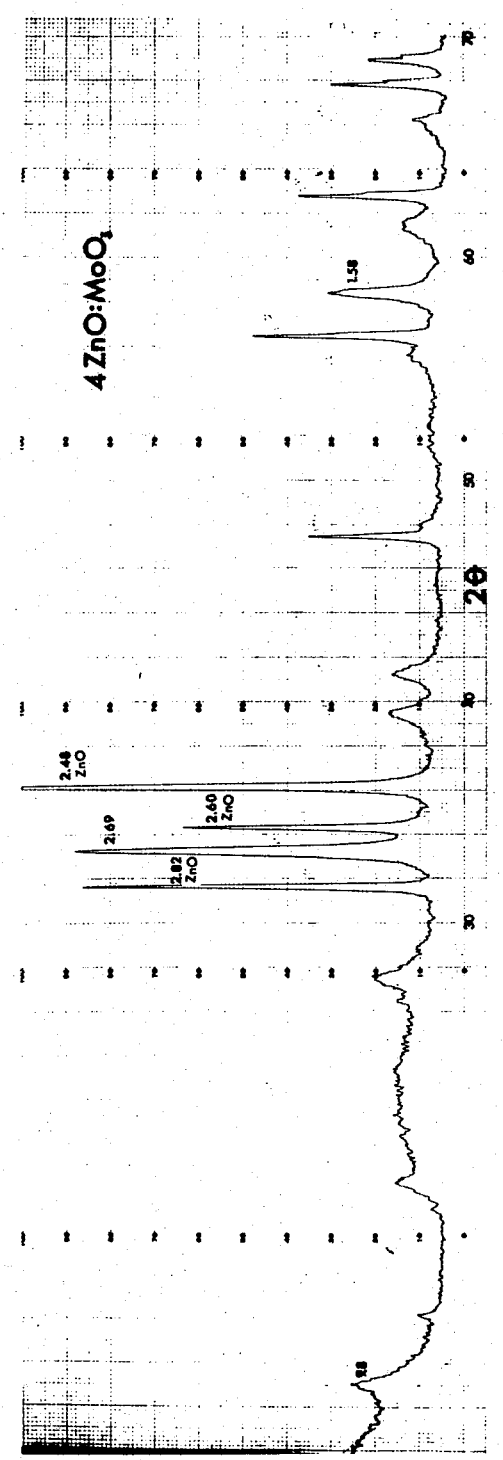

ABSTRACT OF THE DISCLOSURE

The invention is in a molybdated zinc oxide pigment and a process for producing the molybdated zinc oxide pigment by reacting the oxides of zinc and molybdenum.

---

This invention relates to a novel series of rust and corrosion inhibiting molybdated zinc oxide pigments and in particular to a method for the manufacture of the same.

More particularly this invention relates to hydrated molybdated zinc oxide pigments not heretofore produced containing as the novel composition therein a compound having the general formula $2ZnO \cdot MoO_3 \cdot XH_2O$.

Heretofore a number of pigments have been known to impart corrosion and rust inhibiting properties to oleoresinous varnish and oil vehicles in which they were suspended or ground to form paints and enamels. These corrosion resisting pigmented coatings all possess color and most of the pigments known to impart corrosion inhibition to coatings are characterized by a degree of toxicity which prevent their end use whenever contact with foodstuffs was possible. Notable among the prior art coatings were those containing red lead, zinc chromate, strontium chromate and other lead and chromate ion containing compounds and certain iron oxides.

Recently it has been suggested in the art that calcium and zinc molybdates would have corrosion inhibiting properties and be of value in reduced toxicity to living organisms. Tests were conducted using calcium molybdate, normal zinc molybdate $ZnO \cdot MoO_3$ using as mix in additives therewith inert pigments including calcium carbonate and talc as extender pigments to decrease the cost. While the evidence indicated the pigmentary products studied were of value in inhibiting the corrosion of iron and steel when formulated into suitable paints, the general cost of the resultant products were prohibitive, the size of the pigment particles obtained by the proposed processes of double decomposition reactions between water soluble zinc salts (e.g., chloride and sulfate) and sodium molybdate was too large and spread over a particle size range such that two separate classifications were essential in the tests conducted. The fine particle class included calcium molybdate ($CaMoO_4$) of about 3.3 microns; zinc polymolybdate ($5ZNO \cdot 7MoO_3$) of about 3.7 microns and normal zinc molybdate ($ZnMoO_4$) of about 1.3 microns. The coarse particles simultaneously obtained and separated therefrom were of considerably larger average particle diameter, and in the order as given were 28.0 microns for the calcium form, 12.0 microns for the polymolybdate form and 25.6 microns for the normal molybdate.

While it is said in the art that with calcium molybdate the water soluble by-product salts were readily removed from the freshly formed pigmentary product, it is stated that removal of the chloride and sulfate salts from the zinc molybdates was extremely difficult, requiring many multiple washings.

From general experience in the pigment manufacturing art, it is well known that removal of salts such as the sodium chlorides and sulfates present as by-product are most difficult, and additionally it is also well known that the presence of even small quantities of these self-same water soluble salts in the pigments of commerce are a cause and source of decreased durability of paints formulated with them as well as a source of emulsion instability when soluble salt containing pigments are used in the emulsion paint field.

Thus, while the state of the art is such that the value of the molybdate pigments suggested therein is promising, the economic picture is unfavorable because of the high requirement of the expensive molybdenum component, a particle size larger than desired is produced from the evidence at hand, and the method which involves a double decomposition reaction includes the very difficult problem of by-product (chloride or sulfate) salt removal.

In its most novel aspect this invention comprises a new composition of matter comprising a product having the general composition $2ZnO \cdot MoO_3 \cdot XH_2O$ which may be admixed or formed in admixture with other compositions including zinc, molybdenum and oxygen in somewhat different proportions. In any case, in the compositions of this invention the zinc oxide component exceeds the molybdenum trioxide component stoichiometrically and marked differences have been noted between the 1:1 ratio and the 2:1 ratio of ZnO to $MoO_3$ where the new compound has been believed to have been established by the combination of x-ray diffraction studies, infra red absorption curves and actual test results obtained by studies of these pigments when formulated into corrosion inhibiting test paints and exposed to accelerated corrosion tests standardly used in such paint corrosion studies. In the preferred form of the invention the zinc oxide component exceeds the molybdenum trioxide by a mol ratio in excess of 1:1. A definite new composition of matter is believed formed at a 2:1 ratio, and from the 2:1 ratio to about a 10:1 ratio the novel composition formed at the 2:1 level can be identified in the reaction products of the series.

Thus, broadly, the invention embraces ratios of zinc oxide to molybdenum trioxide pigmentary products produced by reaction between zinc oxide pigment and molybdenum trioxide in aqueous medium from in excess of 1:1 ratio to about a 10:1 ratio.

Additionally, pigments are obtained having at least equivalent corrosion inhibiting quality to those containing stoichiometric quantities of ZnO and $MoO_3$ and in most instances are of enhanced value when carefully compared to the zinc molybdate pigments of the prior art. In any event, the molybdated zinc oxides of the present invention provide superior corrosion inhibition per pigment dollar than the zinc molybdate pigments of the prior art.

In the broadest aspect this invention comprises a pigmentary particle preferably but not absolutely essentially so of about not greater than 3 microns average pigment particle diameter and preferably less than one micron comprising, it is belived in theory, a zinc oxide matrix and relatively uniform depth of reaction product of molybdic acid with zinc oxide in intimate contact therewith.

Larger zinc oxide pigments of the order of 2–3 microns in average particle diameter would, of course, produce end products of larger average pigment diameters. However, it is preferred for our purposes to use zinc oxides of less than 3 microns, e.g., 1 micron or less average particle diameter. Larger zinc ozides can be used. Naturally, the larger the particle size of the zinc oxide pigment selected as a reactant, the less surface becomes available for reaction with the molybdic acid in the inventive process described herein. X-ray and infra red examinations support the theory that the reaction product is not the neutral $ZnMoO_4$ of the prior art, but rather a novel basic form corresponding to one or more of the possible series 2ZnO·MoO₃; 3Zn·MoO₃; 4Zn·MoO₃ etc. If, in fact, the basic forms of molybdated zinc oxide theorized about do not exist, the enhanced corrosion resistance of the pigments produced by the method herein described could result alternatively from the freedom from foreign salts, the reduced particle size of the product and posibly from the extremely close physical juxtaposition of neutral zinc molybdate molecules to zinc oxide molecules which are present in excess over theory, or in excess of 1:1 ZnO to MoO₃ and in the smaller average particle diameters of the pigmentary products of the preferred pigments of this invention.

It has not yet been unequivocally established what the exact nature of the compositions obtained may be. X-ray diffraction patterns and infra red studies indicate that the series of pigments produced ranging from about the 1:1 to about 10:1 ratio of ZnO to MoO₃ by the method described produce at least one readily identifiable, definite new chemical compound. It has not yet been established by X-ray diffraction patterns whether or not the molybdated zinc oxides of the series here described and claimed, whose gross compositions contain more than one atom of zinc per atom of molybdenum, actually contains definite chemical compounds as 1:1, 2:1, 3:1, etc. The X-ray diffraction patterns as will be seen in the accompanying figures are complex and potentially suggest more than one compound in intimate admixture. The improvements noted heretofore in practical paint testing programs may be the result of a combination of factors as previously outlined.

Attention is directed to the X-ray diffraction patterns entered as a part of this specification in which.

Figure 1:
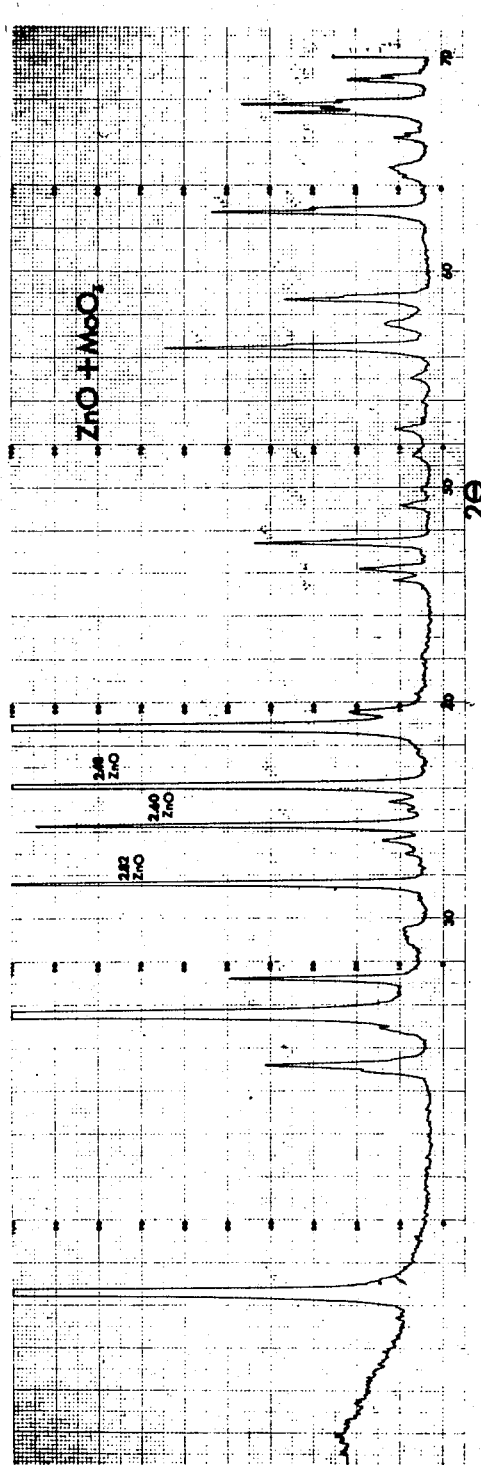
FIG. 1 is an X-ray diffraction pattern of a mere physical blend of one mol of zinc oxide with one mol of molybdenum trioxide.

These figures or diffraction patterns were obtained through use of a Norelco X-ray diffraction unit using a high intensity copper X-ray tube requiring 40 milliamperes at 40 kilovolts. The goniometer scan rate was at one degree per minute with a chart speed of 0.5 inch/minute. The range of scan was from 70° to 5° corresponding to two theta. A scintillation detector was employed using a nickel filter on the detector. Analyzer conditions as to pulse height were as follows: Base line 3.6 volts, window 18.0 volts, 850 volts applied to the detector and amplifier gain was zero, sample holder spinner on 800 counts per second at full scale range. Scale factor 1×16. While equivalent diffraction patterns could be obtained, possibly, with slightly varying conditions, the above set out those used in these X-ray diffraction studies represented in the drawings.

Referring more specifically to the X-ray diffraction spectrum included herein as FIGS. 1 through 5 and initially to FIG. 1, it will be observed that FIG. 1 is a mere physical blend of zinc oxide and molybdenum trioxide in a mol to mol ratio. The X-ray diffraction pattern reveals no new diffraction peaks or lines indicative of a new crystalline phase, and the infrared spectrum reveals no new absorption bonds indicative of new chemical bonds. Peaks or lines at 2.48, 2.60 and 2.82 Angstroms (X-ray) indicate the presence of material amounts of unreacted zinc oxide. The strong peak at 10 Angstroms no doubt reflects unreacted oxides of molybdenum.

Figure 2:
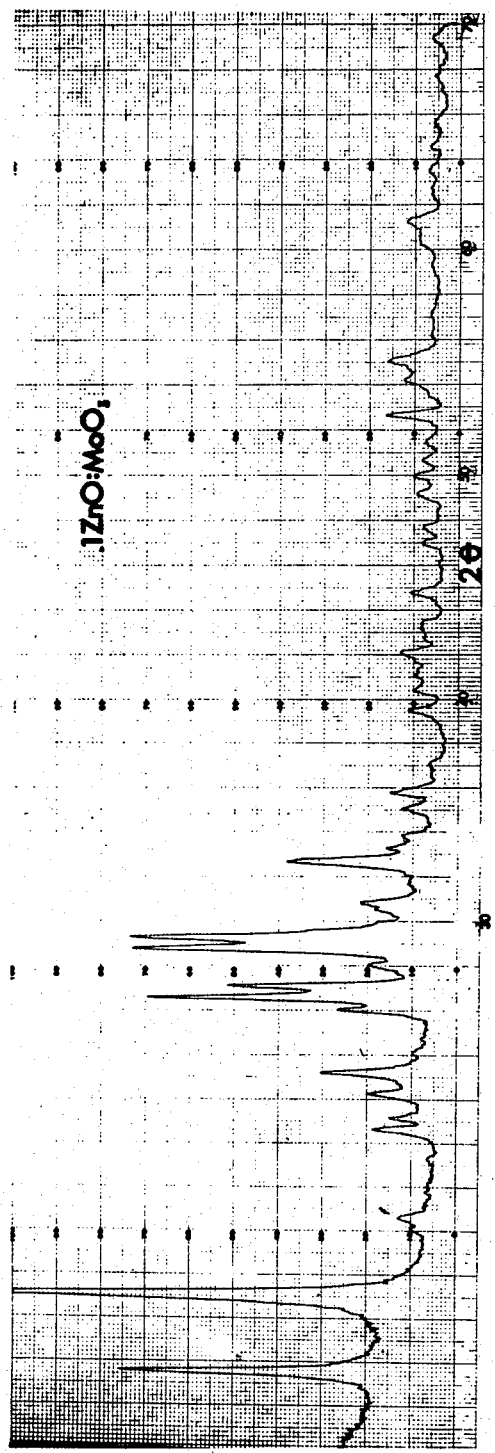
FIG. 2 is an X-ray diffraction pattern of the aqueous reaction product of one mol of zinc oxide with one mol of molybdenum trioxide produced in the manner herein described.

FIG. 2, which is an X-ray diffraction pattern of a mole for mole wet reaction product, shows a multiplicity of new peaks or lines indicating at least one new crystalline phase and possibly more, and the infrared spectrum FIG. 2A shows a multiplicity of new absorption bonds indicating the formation of chemical bonds. However, there is little or no indication of the formation of the new basic zinc molybdate covered by this application. The chemistry of the reaction at the one to one mol ratio is obviously complex and the reaction products are not completely characterized. Accelerated exposure tests of the pigments corresponding thereto in a variety of paint formulations also gave little evidence of corrosion inhibition of paint films containing 1ZnO:1MoO₃ pigments of the quality noted at higher ratios of ZnO to MoO₃.

Figure 3:
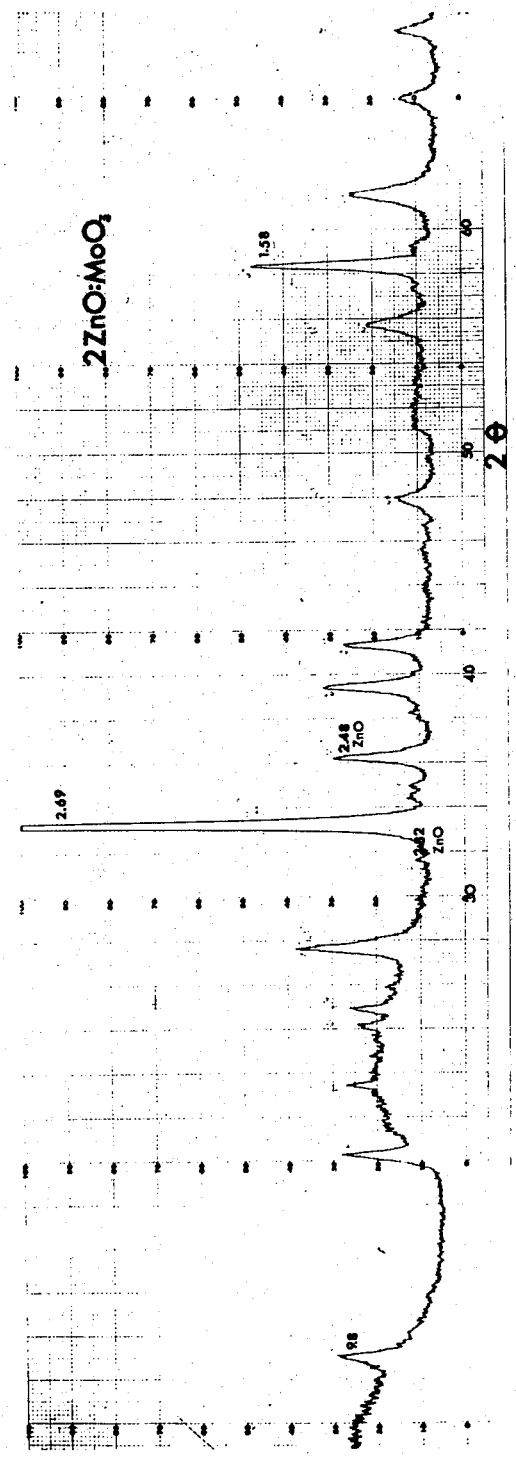
FIG. 3 is an X-ray diffraction pattern of the pigmentary product resulting from two mols of zinc oxide reacted with one mol of molybdenum trioxide produced in accordance with the aqueous method herein illustrated in the examples.

FIG. 3 X-ray spectrum discloses considerable evidence of a new composition of matter being formed of a crystalline nature different than that of the original reactants, the zinc oxide for all practical purposes having disappeared almost completely with only the small peak or line at 2.48 still identifying traces of zinc oxide present in the crystal formation. However, very strong peaks or lines at 1.58 Angstroms, 2.69 Angstroms and 9.8 Angstroms, the showing in FIG. 3A and comparison of FIGS. 1, 2 and 3, establishes with very little doubt that a new compound of 2ZnO·1 MoO₃ as shown in FIG. 3 has been formed.

Figure 4:
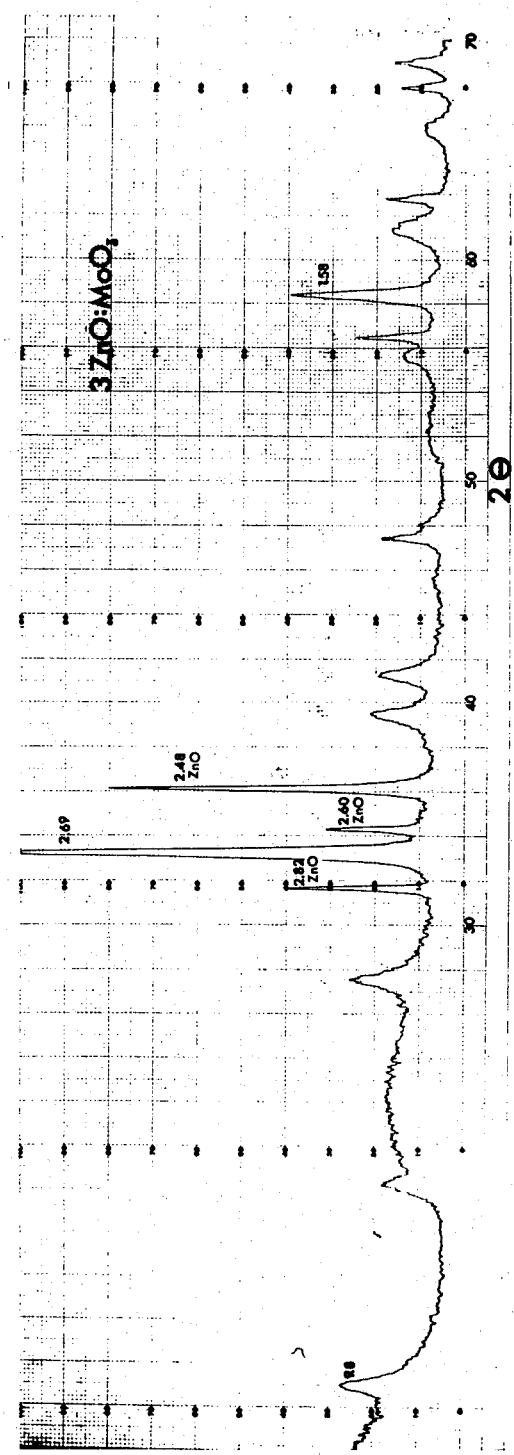
FIG. 4 is an X-ray diffraction pattern of the aqueous reaction product of three mols of zinc oxide reacted with one mol of molybdenum trioxide filtered off, dried and recovered in pigmentary form.

The diffraction peaks observable in FIGS. 3, 4 and 5 are similar to peaks reported for hydrated basic zinc chromate 2ZnO·CrO₃·H₂O and indicates there may be some relationship in the compounds.

It is of interest to tabulate the data from the ASTM file on X-ray diffraction peaks with those here found in the molybdated zinc oxides of this inevntion at a 2:1 ratio of ZnO to MoO₃ and at a 4:1 ratio. There appears to be enough correlation in the compared data to suggest the compounds are possibly isomorphous.

X-RAY DIFFRACTION PEAKS

| Basic Zinc Chromate, 2ZnO·CrO₃·H₂O | Zinc Molybdate, 2:1 ratio | Zinc Molybdate, 4:1 ratio |
|---|---|---|
| 1.49 | 1.51 | 1.51 |
| 1.58 | 1.58 | 1.58 |
| 1.62 | 1.65 | 1.65 |
| 2.15 | 2.18 | 2.18 |
| 2.25 | 2.29 | 2.21 |
| 2.68 | 2.69 | 2.69 |
| 4.71 | 4.83 | 4.87 |
| 9.3 | 9.7 | 9.7 |

Additional studies of the X-ray diffraction spectra of FIGS. 4 and 5 also reveal the characteristic lines of 2ZnO·1MoO₃ at 1.58, 2.69 and 9.8 showing the presence of the crystalline phase first shown in the material reacted at a 2:1 ratio, plus free zinc oxide. These peaks or lines are definitely absent in the 1:1 ratio pigment of FIG. 2. Additionally prominent peaks or lines of zinc oxide at 2.48, 2.60 and 2.82 indicate an excess of zinc oxide, not a part of the 2:1 compound of FIG. 3, but clearly present as shown in FIG. 4 and even stronger in evidence in FIG. 5.

The existence of a new and previously unreported chemical compound was further demonstrated by obtaining infra red spectra. The spectra were obtained for each sample by carefully mixing 0.1 milligrams of the sample with 0.2 grams of potassium bromide and pelletizing the mixture in a hydraulic press at a total pressure of 12.5 tons. The pellet was placed in a Perkin-Elmer Model 21 infra red spectrograph and the tracing obtained.

FIG. 1A is the infra red spectogram of a physical mixture of zinc oxide and molybdenum trioxide.

FIG. 2A is the infra red spectrogram of a product prepared according to Example 5 of the invention, at a mol ratio of 1ZnO:MoO₃.

Figure 3A:
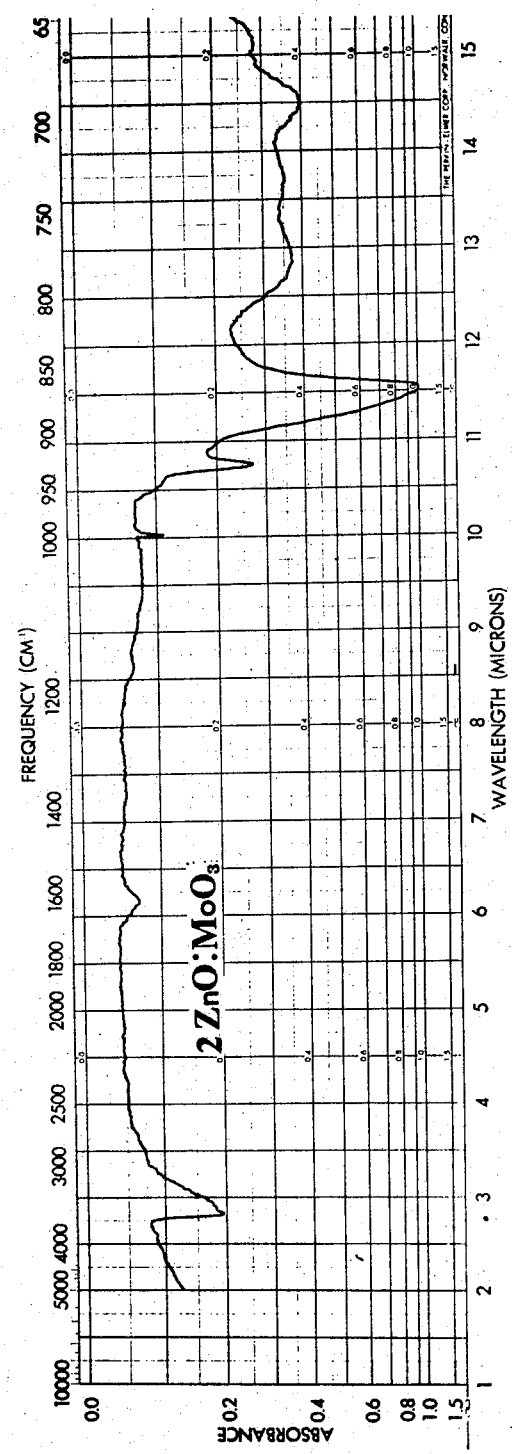

FIG. 3A is the infra red spectogram of a product prepared at a mol ratio of 2ZnO:MoO₃ in accordance with second half of Example 4.

Figure 4A:
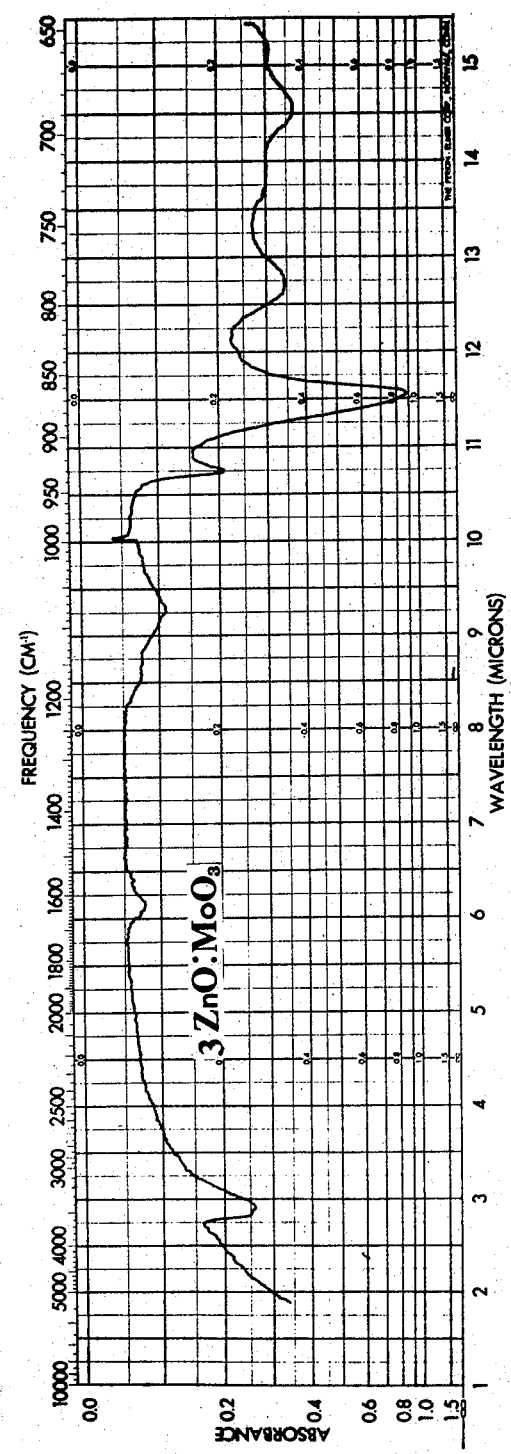

FIG. 4A is the infra red spectrogram of a product prepared according to the first half of Example 4 of the invention, at a mol ratio of 3ZnO:MoO₃.

Figure 5A:
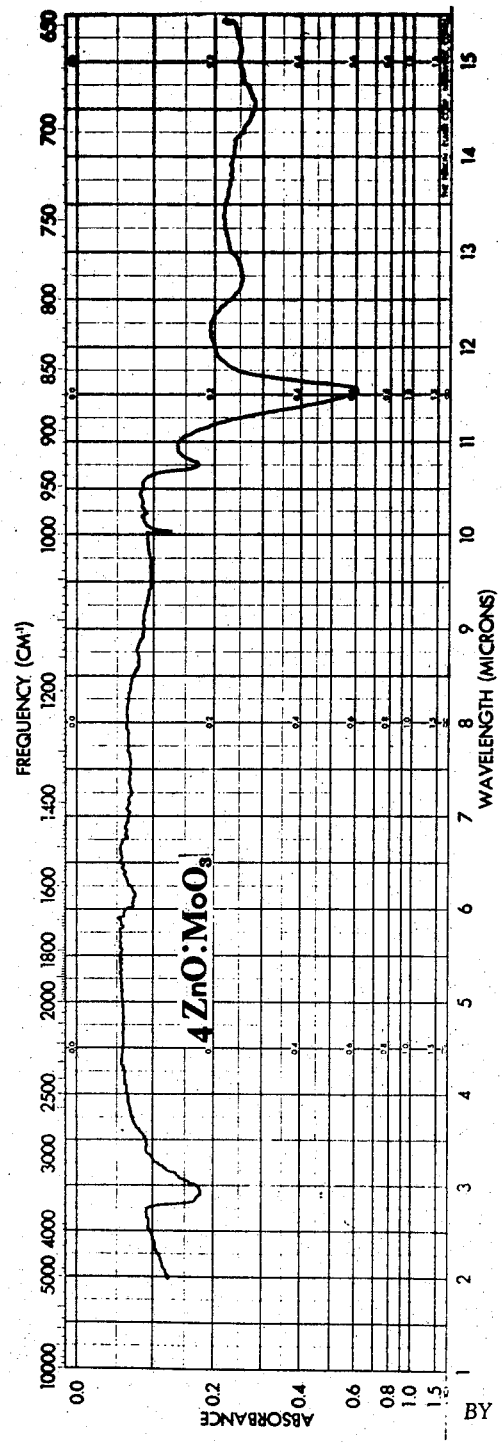
FIG. 5 is also a comparative X-ray diffraction pattern of the aqueous product of reaction of four mols of zinc oxide with one mol of molybdenum trioxide to produce a novel corrosion inhibiting white pigment.

FIG. 5A is the infra red spectogram of a product prepared according to Example 3 of the invention, at a mol ratio of 4ZnO:MoO₃.

FIG. 3A shows a single prominent sharply defined absorption peak at 11.55 microns and a small sharp peak at 10.75 microns. Neither of these peaks is present in the starting materials, as shown in FIG. 1A. These peaks provide cumulative evidence of formation of a new chemical bond and establishing a definite compound at the 2:1 ratio.

Both of these prominent peaks occur at the same wave lengths in the samples with zinc:molybdenum ratios of 3:1 and 4:1, as shown in FIGS. 4A and 5A. However, the intensity of these two peaks is diminished in FIG. 4A and somewhat further diminished in FIG. 5A. This is to be expected from the formation of a 2:1 compound, which at the ratios of 3:1 and 4:1 is reasonably diluted with unchanged zinc oxide. Zinc oxide itself contains no absorption peaks in this region.

FIG. 2A reveals a more complex I.R. pattern indicating the presence of a plurality of different chemical bonds, the significance of which has not yet been explained. It is significant that in this spectogram there is little evidence of peaking at 10.75 and 11.55 microns, suggesting that at a 1:1 ratio of zinc to molybdenum the new compositions of matter covered by this invention do not form, or forms insufficiently to register in the absorption spectrum.

FIG. 1A relating to the mechanical mixture, contains absorption peaks whose absence in the samples made according to this invention indicates the disappearance of the starting materials and thus tends to confirm that a new substance has been formed in all preparations with ratios greater than 1:1 of ZnO to MoO₃.

One preferred process of producing the molybdated zinc oxide pigments is illustratively reduced to practice quite readily as follows: a fluent aqueous slurry of solid molybdenum trioxide is made. A saturated solution at 70° C. contains approximately 2% MoO₃ by weight but the slurries useful far exceed the concentrations indicated by the solubility limit. Undisolved MoO₃ in the slurry provides a reservoir of molybdate ions MoO₄⁼ which go into solution as the active components of the slurry are consumed. The concentration of MoO₃ in the aqueous slurry is not critical, the water providing a carrier for the reactant mixture which reaction mixture should be sufficiently dilute to be easily agitated or stirred, but not so concentrated as to be a paste. Overly dilute slurries require unnecessarily large processing vessels and little advantage. On the other hand, the slurries should be sufficiently dilute to be fluent, easily poured and agitated. A satisfactory level is four parts by weight of MoO₃ per 100 weight parts of water, but this concentration may be appreciably varied without adverse influence.

In another container one produces a slurry of pigmentary zinc oxide of commerce (Oxide 20). Usually zinc oxide pigment is produced by a fuming process and is of extremely fine particle size. Zinc oxides of less than one micron are available in average particle diameters of from 0.27 to about 0.93 microns for paint end use and other grades of even smaller particle sizes ranging from 0.12 microns, 0.27 microns, 0.40 microns and up to coarser grades near about 1 micron are also commercially available. About 20% by weight of the pigment dispersed in water provides a non-critical but convenient fluent slurry. If an acicular grade of zinc oxide pigment is selected, somewhat less pigmentary percentage is advantageous.

The temperature of reaction is not critical and advantageously is carried out from about 70° F. to the boiling point, or about 212° F. Warming of the slurries has produced good results.

The two slurries are admixed, one with the other, with good agitation in a third container, or one may be added to the other. After a brief period of agitation, the admixture becomes more viscous, taking on the appearance of cottage cheese. This phase breaks down upon agitation and it is believed that subsequent to this breakdown the reaction is essentially completed. It is the viscosity at this point which fundamentally controls the amount of water present and the concentrations of the individual slurries. It is undesirable to have the "cheese" stage be so heavy as to materially interfere with rapid agitation at this point. Agitation is continued until a minimum level of molybdenum can be found in the filtrate. Below a 2:1 level of zinc to molybdenum a blue color in the filtrate is not lost showing excess molybdenum not reacted. In more quantitative determinations, lead molybdate is determined by gravimetric analysis as a means of quality control.

Other sources of molybdate ion than the MoO₃ have been employed, but inherently introduce salt removal problems which are extremely difficult to overcome.

When the filtrate shows a substantial absence of molybdenum as described, the new pigmentary molybdated zinc oxides are filtered off, re-slurried in water to wash and the molybdated zinc oxide pigments recovered dried at about 110° C. and broken up into a fine, pulvurent powder for pigmentary end use. The recovered products as shown in the examples for the most part resembled closely the original zinc oxide, being grit-free and having average particle diameters of the order of less than one micron.

Utilizing the above described general technique for manufacture, a series of molybdated zinc oxide pigments were produced over a range of from a 1:1 molar ratio of ZnO to MoO₃ to a 10:1 molar ratio as shown in the examples.

EXAMPLE 1

Pigmentary zinc oxide weighing 2107 grams was slurried in 10 liters of water and heated to 70° C. In another container 371 grams of MoO₃ was slurried in about ten liters of water and likewise heated to 70° C. The two fluent slurries were mixed and stirred for one hour while being maintained at a temperature of 70° C. and one more hour while cooling. A cheese-like stage was passed through. The mixture was filtered, and the filtrate tested for molybdenum; almost no molybdenum was present, the filtrate being substantially colorless. The filter cake was re-slurried, filtered again, dried at 110° C. and pulverized. Chemical analysis showed a ratio of 10ZnO:MoO₃. The product closely resembled the original zinc oxide, being a finely divided grit-free powder, a comparatively free-flowing material. Microscopic examination showed its particle size to be below one micron on the average, about the same as the commercial zinc oxide pigment used as a raw material. The yield was nearly 100% of theory.

EXAMPLE 2

The batch was made in the same way as Example 1 except that 1,949 grams of ZnO and 493.5 grams of MoO₃ were used. The total reaction contained about twenty liters of water. Analysis of the product showed a ratio of 7ZnO:MoO₃. Its physical characteristics were the same as in Example 1.

EXAMPLE 3

This batch was made in the same way as Example 1 except that 1,753 grams of ZnO and 777 grams of $MoO_3$ were used. Analysis of the product showed a ratio of $4ZnO:MoO_3$. Its physical charcteristics were the same as in Example 1.

EXAMPLE 4

This batch was made in the same way as Example 1 except that 1,578 grams of ZnO and 931 grams of $MoO_3$ were used. Analysis of the product showed a ratio of $3ZnO:MoO_3$. Its physical characteristics were the same as in Example 1. Another batch was similarly produced using 1,316 grams of ZnO and 1,165 grams $MoO_3$. Analysis of this showed a $2ZnO:1MoO_3$ ratio.

EXAMPLE 5

The batch was made in the same way except that 448 grams of ZnO and 791 grams of $MoO_3$ were used. Analysis of the product showed a ratio of $1ZnO:MoO_3$. The product of this example was markedly different in physical characteristics from that ofthe preceding examples. The particles were coarser and displayed a marked tendency to cake and to form hard lumps on drying. Furthermore, the drying process was slow and difficult. Perceptible amounts of molybdenum were found in the wash water. (Strong blue color noted in the filtrate).

These pigments int he series were recovered, washed and dried and formulated into a series of test paints. A broad gamut of vehicles were employed, all of which contained an unsaturated drying oil residue in their structure (usually as the ester) and included straight seed oils including linseed oil, oleoresinous varnishes, oil modified alkyd varnishes, epoxy esters, etc., a cross-section of vehicles useful in formulating metal protective and rust inhibitive coatings of the day.

The test paint formulations were carefully balanced out, keeping in mind that the pigment volume concentration or PVC control is important to any reproducible paint test program. The concept of Critical Pigment Volume Concentration (C.P.V.C.) is well known in the paint art and in our tests all paints were adjusted to a point where the pigment volume concentration or P.V.C. was 90% of the Critical Pigment Volume Concentration or C.P.V.C. Greater details of means of carrying forward such fundamentals of paint formulation are found in an article entitled "Oil Absorption and Critical Pigment Volume Concentration" by Asbeck, Laideman and Van Loo, Official Digest, Federation of Paint and Varnish Production Clubs, March 1952; and "The Determination of Critical Pigment Volume Concentration by the Oil Absorption Test Method" by Steig in American Paint Journal, September 22, 1958.

Essentially, the paints were adjusted so that the P.V.C. or pigment volume concentration was about 90% of the C.P.V.C. It is near this point that metal primers show the best combination of rust and blister resistance. As the Critical Pigment Volume Concentration, or C.P.V.C. is the point where the non-volatile portion of the vehicle or liquid organic binder is just sufficient to wet all the pigment particles and just fill all the voids between the pigment particles, one can see that below this pigment level the dry paint film is continuous and impervious. Above this level, the film begins to be permeable, allowing for vapor and liquid transmission through the pores.

Different pigments differ widely in their surface charcteristics and hence absorb different amounts of the paint vehicle. Thus, changes in the pigment quality at the same weight levels may result in a paint with a different critical pigment volume concentration or C.P.V.C. Thus, in evaluating the corrosion inhibition qualities of a pigment, erroneous conclusions may be observed if the paints are not formulated at comparable permeabilities. Considerable efforts were expanded in the evaluation of the corrosion inhibiting pigments compared in the series of tests here described and reported upon to eliminate this common error.

Additionally, the pigment portion of each of the test paints were balanced out so that all formulas in the test of the series contained the same over-all percentage by weight of molybdenum trioxide and zinc oxide; varying, however, in the amount chemically combined in the especially prepared molybdated zinc oxides of the foregoing examples.

Illustratively, when the pigment tested had a ratio of zinc oxide to molybdenum trioxide of 1:1, then relatively 9 mols of additional zinc oxide was included as extender pigment. However, in the tests of the 10:1 ratio pigment complex, no free zinc oxide was included. The term "extender" in reference to pigment in paint formulation is generally used to indicate a mechanical dilution of a more expensive pigment with a quantity of a diluent or less expensive pigment. There is no chemical reaction implied and thus extending with zinc oxide as described is not equivalent to the applicant's "chemical process" of reacting the more expensive molybdenum component with zinc oxide to produce the molybdated zinc oxides of this invention.

The adjusted points (for P.V.C.) were sprayed on clean, vapor degreased cold rolled steel panels for a variety of comparative tests. For comparison, panels of comparative nature were prepared using zinc chromate, calcium molybdate, normal zinc molybdate $ZnO.MoO_3$ prepared by double decomposition, and the materials represented by the examples of molybdated zinc oxides. In general, under water fog and water immersion tests the results were mainly attributable to the difference in the vehicle quality. Epoxy esters generally show no blisters, oleoresinous primers were fairly good in blister resistance with the alkyd primers somewhat poorer by comparison. In salt-fog tests the calcium molybdate primers were poor in humidity resistance in all vehicles and all accelerated tests showed a poor level of rust inhibition.

In general the normal zinc molybdate pigments were poorer in overall performance than the more basic molybdated zinc oxides in the series described.

A comparable series of test panels were exposed to 5% salt spray tests for about 300 hours. Improvement in corrosion inhibition was noted in the molybdated zinc series up to about the 4:1 level which paralleled in quality the zinc chromate control. No further improvement was noted in the series above this ratio though test pigments continued to exhibit good rust inhibition. Optimum value of molybdenum from a cost and performance standpoint was evidenced at the 4:1 ratio. Pigments produced at a 1:1 ratio by the disclosed process were of more uniform particle size and exhibited better rust inhibition than the 1:1 ratio zinc molybdates produced by the old double decomposition reactions (shown as purchased pigments), between sodium molybdate and zinc chloride or sulfate produced in accordance with prior art methods. The smaller, more uniform particle size coupled with the freedom from water soluble salts that are most difficult to remove completely were believed to explain, in part, the improved products of the method in this specific instance as well as in the other product ratios as are herein described and claimed. At ratios below about 2:1 the pigmentary product obtained was relatively more coarse, caking of the precipitate offered more difficulties and appreciable quantities of molybdenum were found in the filtrate. Apparently at ratios of ZnO to $MoO_3$ of less than about 2:1, the molybdic acid is not exhausted from the reaction medium. Above about 10:1 it would appear the molybdenum ion is below a passivating concentration, though the test panels were surprisingly good considering the extreme dilution of the molybdenum present.

While we do not wish to be bound by theory, it has previously been known that basic zinc chromate or zinc tetraoxychromate commonly shown as $$ZnCrO_4 \cdot K_2CrO_4 \cdot ZnO$$

is a superior corrosion inhibiting pigment to neutral $ZnCrO_4$. While one might be led to believe that a "basic" zinc molybdate might be more effective than a "neutral" zinc molybdate, Kirk & Othmer's Encyclopedia of Chemical Technology, volume 9, page 205, states that "basic" molybdates are very rare and that basic lead molybdate $PbO \cdot PbMoO_4$ is the only compound in this class that is well authenticated.

Accumulated test results of interest in examination of the various corrosion inhibitive pigments previously referred to are set out below.

EXAMPLE 6

Molybdated zinc oxide with a 4:1 ratio made according to Example 3 above was formulated into a rust inhibiting paint. The formula used was as follows:

| Pounds | Gallons | Material |
|---|---|---|
| 163 | 4.45 | 4ZnO:1Mo. |
| 344 | 14.83 | Magnesium Silicate. |
| 125 | 3.86 | Titanium Dioxide, Anatase. |
| 4 | 0.30 | An organic treated bentonite clay (Bentone 34). |
| 4 | 0.50 | Soya Lecithin. |
| 85 | 11.00 | Raw Linseed Oil. |
| 176 | 22.00 | Bodied Linseed Oil ($Z_2$–$Z_3$ Gardner-Holdt Body). |
| 66 | 8.83 | Oil Mod. Phenolic Vehicle 60% NVM. |
| 9 | 1.00 | 24% Lead Drier. |
| 7 | 1.00 | 6% Manganese Drier. |
| 7 | 1.00 | Methyl Ethyl Ketoxime (17% Solution). |
| 216 | 33.23 | Mineral Sprits. |
| 1,206 | 102.00 | |

T.Wt./Gal. 11.82.   PVC 38.0%.

Other paints were made using the same formula except that molybdated zinc oxides of lower ratios were used, namely 3:1, 2:1, and 1:1. These pigments were made according to the procedures of Examples 4, 4a and 5. In each case, the amount of molybdenum was fixed at ½ lb. $MoO_3$ per gallon. In all of the low ratio molybdated zinc oxides, an additional amount of straight untreated zinc oxide was added to the formula so as to bring the total zinc content of the formula up to the same level as that in the formula which is given, namely 4 atoms of zinc for every atom of molybdenum. In addition one paint was made with molybdated zinc oxide at a 5.7:1 ratio of zinc to molybdenum containing the same amount of molybdenum trioxide as the previous paints, namely, ½ lb. per gallon. The final paint in this series was a standard commercial rust inhibiting primer containing zinc chromate and red lead.

Steel panels were spray painted with these six paints and the panels exposed to continuous spray with 5% salt solution. They were observed daily for the amount of rust developed, and were rated on a scale where 10 is perfect and 0 is complete failure. The following table gives the results:

These test data illustrate that the performance of the test pigments improves as the ratio of zinc to molybdenum increases up to the level of 4:1. After this there is a very slight decline in rust inhibition. The 4:1 ratio appears best, but there is a plateau where substantially equally good performance is obtained over a range of composition near 4:1. Both the 4:1 and the 5.7:1 ratio paints were substantially comparable in performance as the commercially available zinc chromate-red lead primer which is both dark in color and toxic.

EXAMPLE 7

Molybdated zinc oxide at a 4:1 ratio, made by the procedure given in Example 3 above was made into a rust inhibitive primer paint in each of three commonly used paint vehicles—straight oil type, oil modified alkyd type and epoxy-ester-oil type. The following formulas indicate the manner in which these paints were made:

EXAMPLE 7-A.—RUST INHIBITING OLEORESINOUS PAINT

| Pounds | Gallons | |
|---|---|---|
| 250 | 7.4 | Molybdated Zinc Oxide (4:1). |
| 100 | 3.1 | Titanium Dioxide Anatase. |
| 250 | 10.5 | Talc, Fibrous. |
| 4 | 0.3 | An organic treated bentonite clay (Bentone 34). |
| 4 | 0.5 | Lecithin Soya. |
| 77 | 10.0 | Linseed Oil, Raw. |
| 160 | 20.0 | Linseed Oil, Heat Bodied ($Z_2$–$Z_3$ Gardner-Holdt body). |
| 60 | 8.0 | Linseed Oil-Tung-Oil Modified Phenolic Varnish. |
| 9 | 1.0 | Lead Drier 24%. |
| 7 | 1.0 | Manganese Drier 2%. |
| 7 | 1.0 | Methyl Ethyl Ketoxime 17% Sol, N. |
| 234 | 36.0 | Mineral Spirits. |

EXAMPLE 7-B.—RUST INHIBITING ALKYD PAINT

| Pounds | Gallons | |
|---|---|---|
| 250 | 7.4 | Molybdated Zinc Oxide (4:1). |
| 100 | 3.1 | Titanium Dioxide Anatase. |
| 250 | 10.5 | Talc, Fibrous. |
| 2 | 0.1 | An organic treated bentonite clay (Bentone 34). |
| 4 | 0.5 | Lecithin, Soya. |
| 240 | 30.0 | Soya oil modified Glycero-Phthalate Alkyd. |
| 65 | 10.0 | Mineral spirits. |
| 112 | 14.0 | Soya oil modified Glycero-Phthalate Alkyd resin (long oil). |
| 8 | 1.0 | Calcium Drier 5%. |
| 7 | 1.0 | Manganese Drier 2%. |
| 7 | 1.0 | Cobalt Drier 2%. |
| 7 | 1.0 | Methyl Ethyl Ketoxime 17% Sol, N. |
| 149 | 23.0 | Mineral Spirits. |

TABLE I

| Days after start | 1 | 2 | 3 | 4 | 7 | 8 | 9 | 10 | 11 | 14 | 15 | 16 | 17 |
|---|---|---|---|---|---|---|---|---|---|---|---|---|---|
| 1ZnO:1MoO$_3$ | 6 | 6 | 6 | 5 | 5 | 5 | 4 | 4 | 4 | 4 | 4 | 3 | 3 |
| 2ZnO:1MoO$_3$ | 8 | 8 | 8 | 8 | 8 | 8 | 7 | 7 | 6 | 6 | 6 | 5 | 5 |
| 3ZnO:1MoO$_3$ | 10 | 10 | 9 | 9 | 9 | 8 | 8 | 7 | 7 | 6 | 6 | 5 | 5 |
| 4ZnO:1MoO$_3$ | 9 | 8 | 8 | 8 | 8 | 8 | 8 | 8 | 8 | 7 | 6 | 6 | 6 |
| 5.7ZnO:1MoO$_3$ | 9 | 8 | 8 | 7 | 7 | 7 | 7 | 7 | 7 | 6 | 6 | 6 | 6 |
| Zinc Chromate Red Lead Primer | 10 | 9 | 9 | 9 | 9 | 9 | 8 | 8 | 8 | 7 | 6 | 6 | 6 |

EXAMPLE 7-C.—RUST INHIBITING EPOXY RESIN PRIMER

| Pounds | Gallons | |
|---|---|---|
| 175 | 5.18 | Molybdated Zinc Oxide (4:1). |
| 70 | 2.16 | Titanium Dioxide Anatase. |
| 175 | 7.35 | Talc, Fibrous. |
| 4 | 0.30 | An organic treated bentonite clay (Bentone 34). |
| 134 | 18.00 | A dehydrated castor oil fatty acid-Rosin ester of an Epoxy resin Varnish. |
| 29 | 4.00 | Aromatic Naphtha 100 Flash. |
| 14 | 2.00 | Cobalt Drier 2%. |
| 7 | 1.00 | Zirconium soap Drier Catalyst (6% metal). |
| 3 | 0.50 | Anti-skinning Soln. 18.3% Guiacol. |
| 46 | 7.00 | Mineral Spirits. |
| 4 | 0.50 | Calcium stearate. |

Other sets of paint were likewise manufactured on formulas identical to the above except that other corrosion inhibiting pigments were substituted into the above formulas, replacing the molybdated zinc oxide on an equal volume basis, with the remainder of the formula exactly the same. The following commercially available corrosion inhibiting pigments were purchased and used as substituents: zinc chromate, calcium molybdate, strontium molybdate and zinc molybdate (presumably manufactured by double decomposition). In addition, 1:1 zinc molybdate prepared according to Example 5, above, was made into a paint. Standard commercially available paints in oleoresinous, alkyd and epoxy vehicles and using a combination of zinc chromate and red lead as the corrosion inhibiting pigments, were also included in this series. All of these paints were spray coated onto steel panels and exposed in the 5% salt spray cabinet. The results obtained are given in the following table:

TABLE II

| Pigment | Vehicle | 5% Salt Fog—Corrosion | | | |
|---|---|---|---|---|---|
| | | 100 Hours Rust | | 300 Hours Rust | |
| | | Rust | Creep | Rust | Creep |
| Commercial Primer (Red Lead-Zinc Chromate). | Oil type | 7 | 0 | 5 | 0 |
| Zinc Chromate | ---do--- | 9 | 0 | 8 | 0 |
| Calcium Molybdate | ---do--- | 4 | 0 | 2 | ? |
| Zinc Molybdate 1:1 (Example 5) | ---do--- | 7 | 0 | 6 | 8 |
| Molybdated Zinc Oxide 4:1 | ---do--- | 10 | 0 | 8 | 1 |
| Leaded Zinc Oxide | ---do--- | 9 | 0 | 9 | 1 |
| Commercial Primer | Oil modified alkyd type. | 10 | 0 | 6 | -------- |
| Zinc Chromate | ---do--- | 9 | 0 | 9 | 1 |
| Calcium Molybdate | ---do--- | 6 | 0 | 3 | -------- |
| Zinc Molybdate 1:1 (Example 5) | ---do--- | 9 | 0 | 9 | 4 |
| Molybdated Zinc Oxide 4:1 | ---do--- | 10 | 0 | 9 | 8 |
| Calcium Molybdate | ---do--- | 3 | 0 | 1 | -------- |
| Strontium Molybdate | ---do--- | 2 | 0 | 1 | -------- |
| 1:1 Zinc Molybdate (Purchased) | ---do--- | 6 | 0 | 3 | -------- |
| Commercial Primer | Oil modified Epoxy Ester type. | 10 | 0 | 9 | 2 |
| Zinc Chromate | ---do--- | 10 | 0 | 9 | 1 |
| Calcium Molybdate | ---do--- | 7 | 0 | 5 | -------- |
| Zinc Molybdate 1:1 (Example 5) | ---do--- | 10 | 2 | 9 | 4 |
| Molybdated Zinc Oxide 4:1 | ---do--- | 8 | 0 | 8 | 5 |

10=perfect, 0=complete failure.

Having thus described and illustrated my invention, I claim:

1. A method of preparation of a molybdated zinc oxide pigment which comprises reacting together in an aqueous environment in excess of one mol of pigmentary zinc oxide and up to 10 moles thereof for each mol of molybdenum trioxide and recovering a corrosion inhibitive pigmentary product therefrom free from elements other than those inherent in the named reactants.

2. A method of manufacture of a novel class of pigmentary molybdated zinc oxides which comprises reacting in an aqueous slurry in excess of 1 mol of zinc oxide pigment and up to 10 moles thereof, for each mol of molybdenum trioxide for such period that substantially all of the molybdenum present in the reaction mixture is reacted with the zinc oxide to form a water insoluble precipitate, the filtrate of which is substantially free from molybdate ions and recovering the precipitated molybdated zinc oxide therefrom in pigmentary form.

3. A method of manufacture of a novel corrosion inhibiting molybdated zinc oxide pigment from finely divided molybdenum trioxide and pigmentary zinc oxide which comprises producing an aqueous slurry of one of the two components and intimately incorporating and admixing the other of said components into said slurry, controlling the molar ratios of the said reactants so that the zinc oxide is present in excess of 1 mol of zinc oxide and up to 10 moles thereof for each mol of molybdenum trioxide and recovering the water insoluble reaction product in pigmentary form.

4. A method of manufacture of a corrosion inhibiting molybdated zinc pigment which comprises intimately admixing one fluent aqueous slurry with another, one of said fluent aqueous slurries containing in excess of one mol to not more than about ten mols of commercial pigmentary zinc oxide (ZnO) and the other of said aqueous slurries containing sufficient molybdic acid (MoO$_3$) to provide a ratio of ZnO to MoO$_3$ of in excess of 1:1 but not more than 10:1 when said first slurry is intimately admixed and reacted with said molybdic acid containing second slurry, reacting said slurries until the filtrate therefrom is substantially free of molybdate ion, and recovering the precipitated reaction-product pigment in a form essentially free of chlorides and sulfates.

References Cited

UNITED STATES PATENTS

3,214,283  10/1965  Chopoorian _____ 106—296

OTHER REFERENCES

Carrier et al., Bull. Soc. Chim. de France, 1948, pp. 261 and 262.

TOBIAS E. LEVOW, *Primary Examiner.*

HELEN M. McCARTHY, JAMES E. POER, *Examiners.*